United States Patent
Karlsson et al.

(10) Patent No.: US 9,068,494 B2
(45) Date of Patent: Jun. 30, 2015

(54) METHOD AND SYSTEM FOR EXHAUST CLEANING

(75) Inventors: Carl-Johan Karlsson, Strömstad (SE); Klas Telborn, Södertälje (SE)

(73) Assignee: SCANIA CV AB (SE)

(*) Notice: Subject to any disclaimer, the term of this patent is extended or adjusted under 35 U.S.C. 154(b) by 148 days.

(21) Appl. No.: 13/818,320

(22) PCT Filed: Aug. 23, 2011

(86) PCT No.: PCT/SE2011/051010
§ 371 (c)(1),
(2), (4) Date: Feb. 22, 2013

(87) PCT Pub. No.: WO2012/030275
PCT Pub. Date: Mar. 8, 2012

(65) Prior Publication Data
US 2013/0145930 A1  Jun. 13, 2013

(30) Foreign Application Priority Data
Aug. 31, 2010  (SE) .................................. 1050892

(51) Int. Cl.
*B01D 46/46* (2006.01)
*F01N 11/00* (2006.01)
(Continued)

(52) U.S. Cl.
CPC ............ *F01N 11/002* (2013.01); *F01N 3/0231* (2013.01); *F01N 3/103* (2013.01); *F01N 3/106* (2013.01); *F01N 3/2066* (2013.01); *F01N 9/002* (2013.01); *F01N 2560/06* (2013.01); *F01N 2560/14* (2013.01); *F01N 2900/0408* (2013.01); *F01N 2900/0601* (2013.01);
(Continued)

(58) Field of Classification Search
CPC .... E21B 43/34; B01D 53/0454; G01N 38/30; F01N 9/005; F01N 3/023; Y02T 10/47; F02D 41/029
USPC .......................................................... 95/18
See application file for complete search history.

(56) References Cited

U.S. PATENT DOCUMENTS

| | | | | |
|---|---|---|---|---|
| 4,916,897 | A * | 4/1990 | Hayashi et al. ................. | 60/286 |
| 6,966,179 | B2 * | 11/2005 | Onodera et al. ................ | 60/295 |
| 2003/0106309 | A1 | 6/2003 | Morimoto et al. .............. | 60/295 |
| 2004/0261401 | A1 * | 12/2004 | Ohkl et al. ...................... | 60/285 |
| 2005/0050883 | A1 * | 3/2005 | Nishimura ...................... | 60/286 |
| 2006/0059893 | A1 * | 3/2006 | Plote et al. ...................... | 60/285 |
| 2006/0191258 | A1 * | 8/2006 | Opris .............................. | 60/297 |

(Continued)

FOREIGN PATENT DOCUMENTS

| | | |
|---|---|---|
| DE | 101 44 958 | 3/2003 |
| DE | 10 2008 058 418 | 5/2010 |

OTHER PUBLICATIONS

International Search Report mailed Nov. 24, 2011 in corresponding PCT International Application No. PCT/SE2011/051010.

*Primary Examiner* — Amber Orlando
(74) *Attorney, Agent, or Firm* — Ostrolenk Faber LLP (57) ABSTRACT

A method pertaining to regeneration of a particle filter (202) pertaining to a combustion process, which filter is arranged to treat exhaust gases arising from combustion in a combustion engine (101). When at least one measure for raising the temperature of the particle filter (202) is activated, determining a temperature for the particle filter (202), comparing the temperature determined with a first temperature and discontinuing the measure for raising the temperature of the particle filter (202) when the temperature determined is below the first temperature.

18 Claims, 5 Drawing Sheets

(51) Int. Cl.
*F01N 3/023* (2006.01)
*F01N 3/10* (2006.01)
*F01N 9/00* (2006.01)
*F01N 13/00* (2010.01)
*F01N 3/20* (2006.01)
*F02B 37/00* (2006.01)

(52) U.S. Cl.
CPC .......... *F01N 2900/1404* (2013.01); *F01N 2900/1606* (2013.01); *F02B 37/00* (2013.01); *Y02T 10/47* (2013.01); *F01N 13/0097* (2014.06)

(56) References Cited

U.S. PATENT DOCUMENTS

| | | | |
|---|---|---|---|
| 2008/0078170 A1* | 4/2008 | Gehrke et al. | 60/295 |
| 2008/0163610 A1* | 7/2008 | Baird et al. | 60/295 |
| 2009/0056316 A1* | 3/2009 | Haseyama et al. | 60/286 |
| 2009/0107118 A1* | 4/2009 | Ruona | 60/286 |
| 2009/0164108 A1 | 6/2009 | Baird et al. | 701/115 |
| 2009/0193791 A1 | 8/2009 | Colignon | 60/286 |
| 2009/0313975 A1* | 12/2009 | Mccombs | 60/290 |
| 2010/0089042 A1* | 4/2010 | King et al. | 60/295 |

* cited by examiner

METHOD AND SYSTEM FOR EXHAUST CLEANING

CROSS-REFERENCE TO RELATED APPLICATIONS

The present application is a 35 U.S.C. §§371 national phase conversion of PCT/SE2011/051010, filed Aug. 23, 2011, which claims priority of Swedish Application No. 1050892-7, filed Aug. 31, 2010, the contents of which are incorporated herein by reference. The PCT International Application was published in the English language

FIELD OF THE INVENTION

The present invention relates to particle filters and in particular to a method for regeneration of particle filters. The invention relates also to a system and a vehicle.

BACKGROUND TO THE INVENTION

Growing official concern about pollution and air quality, especially in urban areas, has led to the adoption of emission standards and rules in many jurisdictions.

Such emission standards often set requirements which define acceptable limits for exhaust discharges from vehicles equipped with combustion engines. These standards often regulate, for example, levels of discharge of nitrogen oxides ($NO_x$), hydrocarbons (HC), carbon monoxide (CO) and particles from most types of vehicles.

The endeavour to meet such emission standards has led to ongoing research with a view to reducing emissions by means of post-treatment (cleaning) of the exhaust gases which arise from combustion in a combustion engine.

One way to post-treat exhaust gases from a combustion engine is a so-called catalytic cleaning process, so vehicles and many other at least large means of transport powered by combustion engines are usually also provided with at least one catalyst.

Post-treatment systems may also, either alternatively or in combination with one or more catalysts, comprise other components, e.g. particle filters. There are also cases where particle filters and catalysts are integrated with one another.

Combustion of fuel in the cylinders of a combustion engine results in the formation of soot particles. Particle filters are used to capture these soot particles, and work in such a way that the exhaust flow is led through a filter structure whereby soot particles are captured from the passing exhaust flow and are stored in the particle filter.

The particle filter fills with soot progressively during vehicle operation, and has sooner or later to be emptied of it, which is usually achieved by so-called regeneration.

Regeneration involves the soot particles, which mainly consist of carbon particles, being converted to carbon dioxide and/or carbon monoxide in one or more chemical processes, which regeneration may in principle be effected in two different ways. One way is regeneration by so-called oxygen ($O_2$) based regeneration, also called active regeneration. In active regeneration, carbon is converted by oxygen to carbon dioxide and water.

This chemical reaction requires relatively high particle filter temperatures for desired reaction rates (filter emptying rates) to be achieved at all.

Instead of active regeneration, it is possible to apply $NO_2$ based regeneration, also called passive regeneration. In passive regeneration, nitrogen oxides and carbon oxides are formed by a reaction between carbon and nitrogen dioxide. The advantage of passive regeneration is that desired reaction rates, and hence the rate at which the filter is emptied, can be achieved at significantly lower temperatures.

When the particle filter is full of soot, the vehicle's control system usually determines, e.g. by means of suitable algorithms, appropriate times for regeneration of the filter by passive regeneration. When the soot load in the filter has then decreased to a desired level, the regeneration is deemed completed. As the regeneration is temperature-dependent, measures are adopted in the control of the engine to raise the exhaust temperature and thereby achieve quicker regeneration.

Such measures for raising the exhaust temperature do however entail a cost in the form of fuel consumption. If the exhaust temperature cannot be raised to levels at which passive regeneration can be effected as quickly as desired, the vehicle may run with temperature-raising measures activated for a long time, potentially resulting in substantial costs due to increased fuel consumption.

There is therefore a need for an improved solution for regeneration of particle filters whereby such situations can be avoided.

SUMMARY OF THE INVENTION

An object of the present invention is to propose a method for regenerating particle filters in an effective way. This object is achieved by a method according to the invention.

The present invention relates to a method pertaining to regeneration of a particle filter pertaining to a combustion process, which filter is adapted to treatment of exhaust gases arising from combustion in a combustion engine. The method, when at least one measure for raising the temperature of said particle filter is activated, comprises determining a temperature of said particle filter, comparing said temperature determined with a first temperature and discontinuing said measure for raising the temperature of said particle filter when said temperature determined is below said first temperature.

The one or more temperature-raising measures adopted during regeneration of particle filters usually result in considerable increase in the vehicle's fuel consumption. According to the present invention, temperature-raising measures are discontinued when the filter temperature, despite ongoing measures, is still too low to achieve a desired regeneration rate. According to the present invention, fuel may therefore be saved in situations in which no regeneration takes place or in which regeneration takes place at such a low rate that the increased fuel consumption is not justifiable.

The regeneration process may for example refer to regeneration LO of particle filters of vehicles. Vehicles may be run in such a way that the exhaust temperature during passive regeneration cannot be raised to levels at which it is effected as quickly as desired. This means that the vehicle may run with temperature-raising measures for a very long time, and often, with virtually no passive regeneration. This is very expensive in terms of fuel consumption and the present invention can prevent such situations.

Further characteristics of the present invention and advantages thereof are indicated by the detailed description set out below of embodiment examples and the attached drawings.

DETAILED DESCRIPTION OF PREFERRED EMBODIMENTS

Figure 1A:
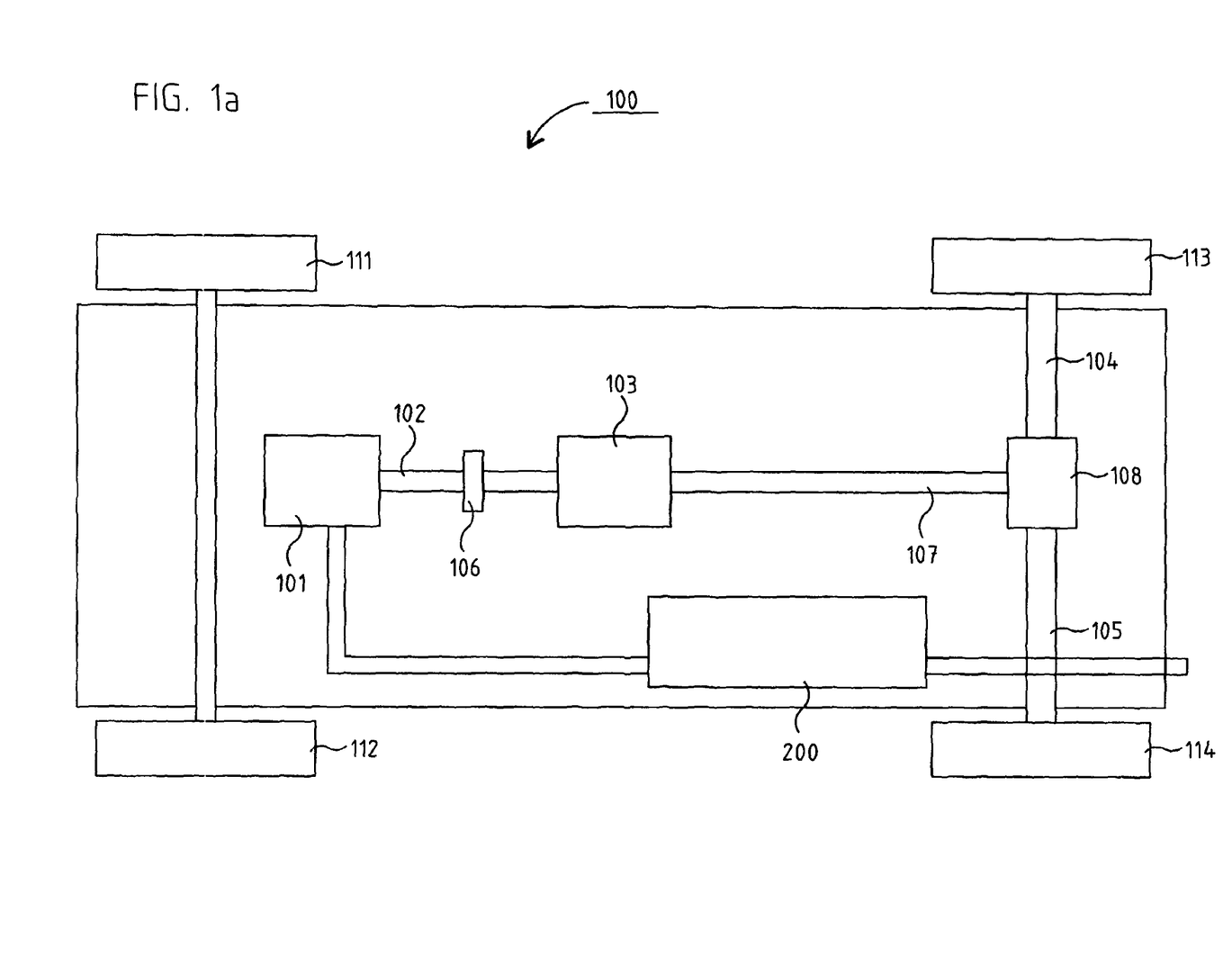
FIG. 1a depicts a power train of a vehicle in which the present invention may with advantage be used.

FIG. 1a depicts schematically a heavy vehicle 100, e.g. a truck, bus or the like, according to an example of an embodiment of the present invention. The vehicle 100 schematically depicted in FIG. 1a comprises a pair of forward wheels 111, 112 and a pair of powered rear wheels 113, 114. The vehicle further comprises a power train with a combustion engine 101 connected in a conventional way, by an output shaft 102 of the engine 101, to a gearbox 103, e.g. via a clutch 106.

An output shaft 107 from the gearbox 103 drives the powered ?0 wheels 113, 114 via a final gear 108, e.g. a conventional differential, and driveshafts 104, 105 which are connected to said final gear 108.

The vehicle 100 further comprises a post-treatment (exhaust cleaning) system 200 for treatment (cleaning) of exhaust discharges from the engine 101.

Figure 2:
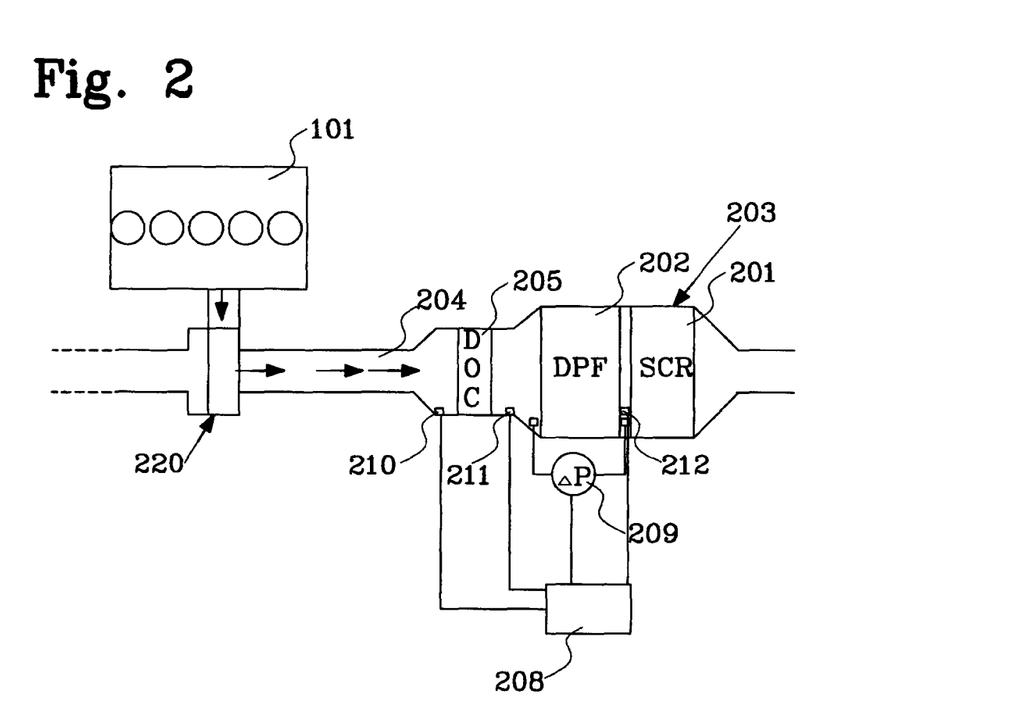
FIG. 2 depicts an example of a post-treatment system of a vehicle in which the present invention may with advantage be used.

The post-treatment system is depicted in more detail in FIG. 2. The diagram illustrates the engine 101 of the vehicle 100, in which the exhaust gases generated by the combustion are led via a turbo unit 220 (in turbo engines the exhaust flow arising from the combustion often drives a turbo unit used to compress the incoming air for the combustion in the cylinders). The function of turbo units is very well known and is therefore not described in more detail here. The exhaust flow is then led via a pipe 204 (indicated by arrows) to a particle filter (diesel particulate filter, DPF) 202 via an oxidation catalyst (diesel oxidation catalyst, DOC) 205.

The post-treatment system further comprises an SCR (selective catalytic reduction) catalyst 201 situated downstream of the particle filter 202. SCR catalysts use ammonia ($NH_3$), or a compound from which ammonia can be generated/formed, as additive for reducing the amount of nitrogen oxides $NO_R$.

The particle filter 202 may alternatively be situated downstream of the SCR catalyst 201, although this may be less advantageous in cases where the present invention relates to so-called passive regeneration which is dependent on the nitrogen oxides which are usually reduced by the SCR catalyst. According to an embodiment of the present invention, the post-treatment system does not comprise an SCR catalyst at all.

The oxidation catalyst DOC 205 has several functions and utilises the surplus air to which the diesel engine process generally gives rise in the exhaust flow as a chemical reagent in conjunction with a noble metal coating in the oxidation catalyst. The catalyst is normally used primarily to oxidise remaining hydrocarbons and carbon monoxide in the exhaust flow to carbon dioxide and water.

The oxidation catalyst may however also oxidise to nitrogen dioxide ($NO_2$) a large proportion of the nitrogen monoxides (NO) present in the exhaust flow. This nitrogen dioxide is then utilised in passive regeneration according to the present invention. Further reactions may also take place in the oxidation catalyst.

In the embodiment depicted, DOC 205, DPF 202 and also the SCR catalyst 201 are integrated in a combined exhaust cleaning unit 203. It should however be noted that DOC 205 and DPF 202 need not be integrated in a combined exhaust cleaning unit but may instead be arranged in some other way found appropriate. For example, DOC 205 may be situated nearer to the engine 101. The SCR catalyst may likewise be separate from DPF 202 and/or DOC 205.

The post-treatment system set-up depicted in FIG. 2 usually occurs in heavy vehicles, at least in jurisdictions where stringent emission requirements apply, but as an alternative to the oxidation catalyst the particle filter may instead be provided with noble metal coatings so that the chemical processes which would occur in the oxidation catalyst occur instead in the particle filter, and the post-treatment system therefore has no DOC.

As previously mentioned, the combustion in the engine 101 results in the formation of soot particles. These soot particles need not, and are in many cases not allowed to, be discharged into the surroundings of the vehicle. Diesel particles consist of hydrocarbons, carbon (soot) and inorganic substances such as sulphur and ash. As mentioned above, these soot particles are therefore captured by the particle filter 202, which works in such a way that the exhaust flow is led through a filter structure in which soot particles are captured from the passing exhaust flow in order to be stored in the filter 202. A very large proportion of the particles may be separated from the exhaust flow by the filter.

The particles thus separated from the exhaust flow therefore accumulate in the filter 202, causing it to fill with soot over time. Depending on factors such as current driving conditions, the driver's mode of driving and the vehicle's load, a larger or smaller amount of soot particles will be generated, so this filling will take place more or less quickly, but when the filter reaches a certain level of filling it needs "emptying". If the filter is full to too high a level the vehicle's performance may be affected and there may also be fire hazards due to soot accumulation in combination with high temperatures.

As above, emptying the particle filter 202 is done by regeneration whereby soot particles, carbon particles, are converted in a chemical process to carbon dioxide and/or carbon monoxide. Over time the filter 202 has therefore to be regenerated at more or less regular intervals, and determining suitable times for its regeneration may for example be by means of a control unit 208 which may for example determine a suitable time or times at least partly on the basis of signals from a pressure sensor 209 which measures the differential pressure across the filter. The fuller the filter 202 becomes, the higher the pressure difference across it will be.

No regeneration action is normally taken so long as the filter's filling level remains below some predetermined level. For example, the control system's control of filter regeneration may be so arranged that no action is taken so long as the filter's degree of filling is for example below some suitable level within the range 60-80%. The degree of filling may be estimated in any suitable way, e.g. on the basis of differential pressure as above, in which case a certain pressure difference will represent a certain degree of filling.

The control unit 208 also controls the regeneration process according to the present invention, as described in more detail below.

Generally, control systems in modern vehicles usually comprise a communication bus system consisting of one or more communication buses for connecting together a number of electronic control units (ECUs), or controllers, and various components located on the vehicle. Such a control system may comprise a large number of control units, and the responsibility for a specific function may be divided among two or more of them.

For the sake of simplicity, FIG. 2 depicts only the control unit 208, but vehicles of the type depicted often have a relatively large number of control units, e.g. for control of engine, gearbox etc., as is well known to specialists within the technical field.

The present invention may be implemented in the control unit 208 but may also be implemented wholly or partly in one or more other control units with which the vehicle is provided.

Control units of the type depicted are normally adapted to receiving sensor signals from various parts of the vehicle, e.g., as depicted in FIG. 2, said pressure sensor 209 and temperature sensors 210-212, and also, for example, an engine control unit (not depicted). The control signals generated by control units normally depend also both on signals from other control units and on signals from components. For example, the control exercised by the control unit 208 over regeneration according to the present invention may for example depend on information received for example from the engine control unit and the temperature/pressure sensors depicted in FIG. 2.

Control units of the type depicted are also usually adapted to delivering control signals to various parts and components of the vehicle, e.g. in the present example to the engine control unit to demand/order control of the engine's combustion as below.

The control is often governed by programmed instructions. These instructions take typically the form of a computer programme which, when executed in a computer or control unit, causes the computer/control unit to effect desired forms of control action, e.g. method steps according to the present invention. The computer programme usually takes the form of a computer programme product 109 which is stored on a digital storage medium 121 (see FIG. 1b), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behaviour in a specific situation may thus be adjusted by altering the computer programme's instructions.

Figure 1B:
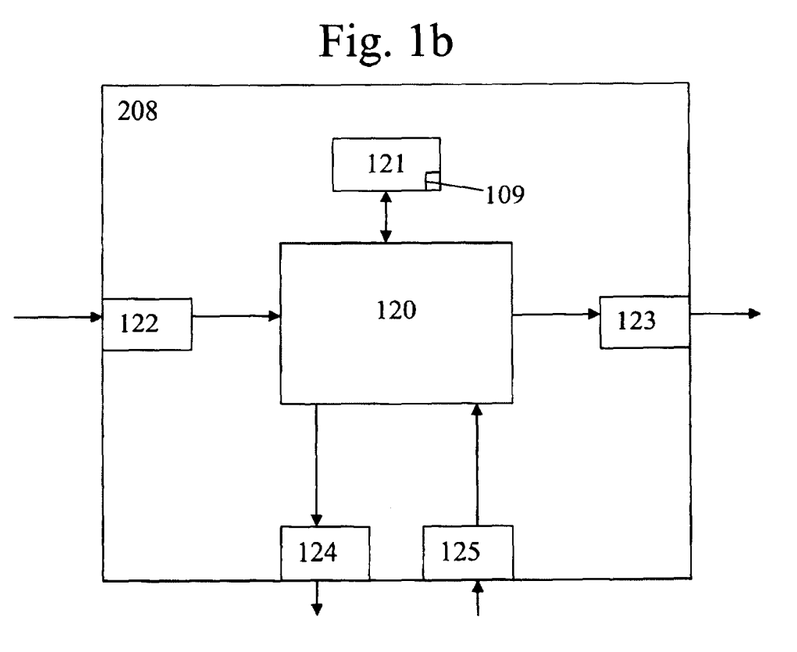
FIG. 1b depicts an example of a control unit in a vehicle control system.

An example of a control unit (the control unit 208) is depicted schematically in FIG. 1b, which control unit 208 may itself comprise a calculation unit 120 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit 121 which provides it with, for example, the stored programme code 109 and/or the stored data which the calculation unit 120 needs for it to be able to perform calculations. The calculation unit 120 is also arranged to store partial or final results of calculations in the memory unit 121.

The control unit 208 is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 120 can process.

These signals are thereafter conveyed to the calculation unit 120. The output signal sending devices 123, 124 are arranged to convert signals received from the calculation unit 120 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, a MOST (Media Orientated Systems Transport) bus or some other bus configuration, or a wireless connection.

As above, regeneration may in principle be effected in two different ways. One way is by so-called oxygen ($O_2$) based regeneration, also called active regeneration. In active regeneration a chemical process takes place substantially as follows:

$$C+O_2=CO_2+\text{heat} \quad\quad\quad (\text{eq. 1})$$

Active regeneration thus converts carbon plus oxygen gas to carbon dioxide plus heat. However, this chemical reaction is very temperature-dependent and requires relatively high filter temperatures for acceptable reaction rates to be achieved at all. A lowest filter temperature of 500° C. is typically required, but a still higher temperature is preferable for regeneration to take place at desired rates.

However, the maximum temperature usable in active regeneration is often limited by tolerances of the components concerned. For example, the particle filter 202 and/or any downstream SCR catalyst often have design limitations with regard to the maximum temperature to which components may be subjected. This means that active regeneration may, owing to components affected, be subject to an unacceptably low maximum permissible temperature. At the same time, a very high lowest temperature is therefore required for any usable reaction rate to be achieved at all. In active regeneration, the soot load in the filter 202 is normally burnt substantially completely. After total regeneration of the filter, its soot level will be substantially 0%.

It is now increasingly common that vehicles are equipped not only with particle filters 202 but also with SCR catalysts 201, in which case active regeneration may entail problems in the form of overheating of the downstream SCR catalyst treatment process.

At least partly for this reason, the present invention applies $NO_2$ based (passive) regeneration instead of the active regeneration described above. In passive regeneration, nitrogen oxide and carbon oxide are formed in a reaction between carbon and nitrogen dioxide as follows:

$$NO_2+C=NO+CO \quad\quad\quad (\text{eq. 2})$$

The advantage of passive regeneration is that desired reaction rates, and hence the rate at which the filter is emptied, are achieved at lower temperatures. Passive regeneration of particle filters typically takes place at temperatures within the range 200° C.-500° C., although temperatures in the upper part of this range are normally preferable. This substantially lower temperature range than in active regeneration is nevertheless a great advantage in cases where, for example, there are SCR catalysts, since it entails no risk of reaching such a high temperature level as to cause risk of damage to the SCR catalyst. It is nevertheless still important that a relatively high temperature be achieved as above, and the present invention relates to a method for avoiding regeneration in situations where effective regeneration is not deemed possible.

Figure 3:
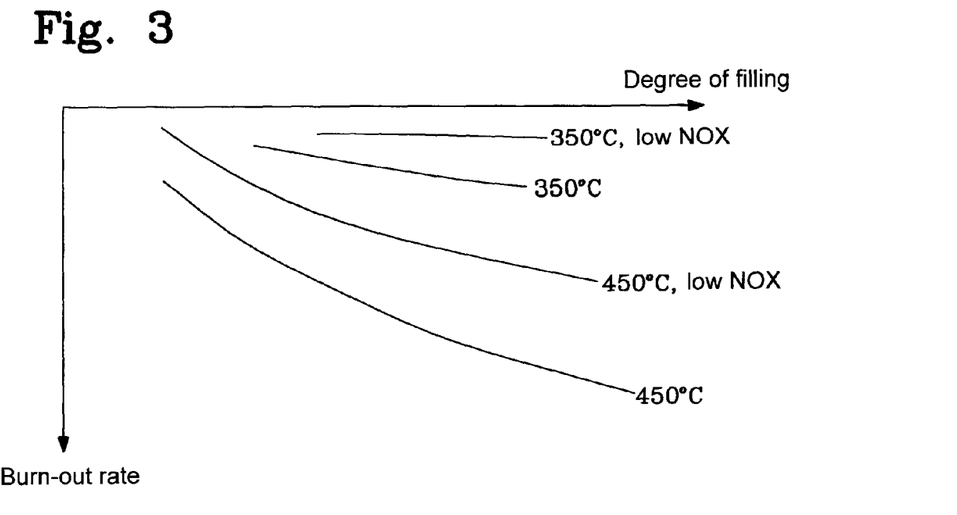
FIG. 3 depicts an example of regeneration rate (soot burn-out rate) as a function of amounts of soot in the particle filter, and its temperature dependency.

FIG. 3 depicts an example of regeneration rate (soot burnout rate) as a function of amounts of soot in the particle filter 202 in operating situations at two different temperatures (350° C. and 450° C.). The regeneration rate is also exemplified for respective low and high concentrations of nitrogen dioxide. As may be seen in the diagram, the burn-out rate is low at low temperature (350° C.) and low concentration of nitrogen dioxide. The temperature dependency of the regeneration rate is clearly indicated by the burn-out rate being relatively low even at high concentrations of nitrogen dioxide so long as the filter temperature is low. Burn-out rates are substantially higher at 450° C. even in the case of low concentration of nitrogen dioxide, although high contents of nitrogen dioxide are obviously preferable.

However, passive regeneration depends not only on the particle filter's temperature and amount of soot as in FIG. 3 but also, as indicated by equation 2 above and FIG. 3, on access to nitrogen dioxide. However, the proportion of nitrogen dioxide ($NO_2$) to the total amount of nitrogen oxides ($NO_x$) generated by the engine's combustion is normally only about 0-10%. When the engine is under heavy load, the proportion of $NO_2$ may be as low as 2-4%. With the object of achieving rapid regeneration of the filter, it is therefore desirable that the proportion of nitrogen dioxide in the exhaust flow entering the filter 202 be as high as possible.

It is therefore desirable to increase the amount of nitrogen dioxide $NO_2$ in the exhaust flow arising from the engine's combustion. There are several different ways of effecting this conversion, and it may be achieved by means of the oxidation catalyst 205, in which nitrogen oxide can be oxidised to nitrogen dioxide.

Figure 4:
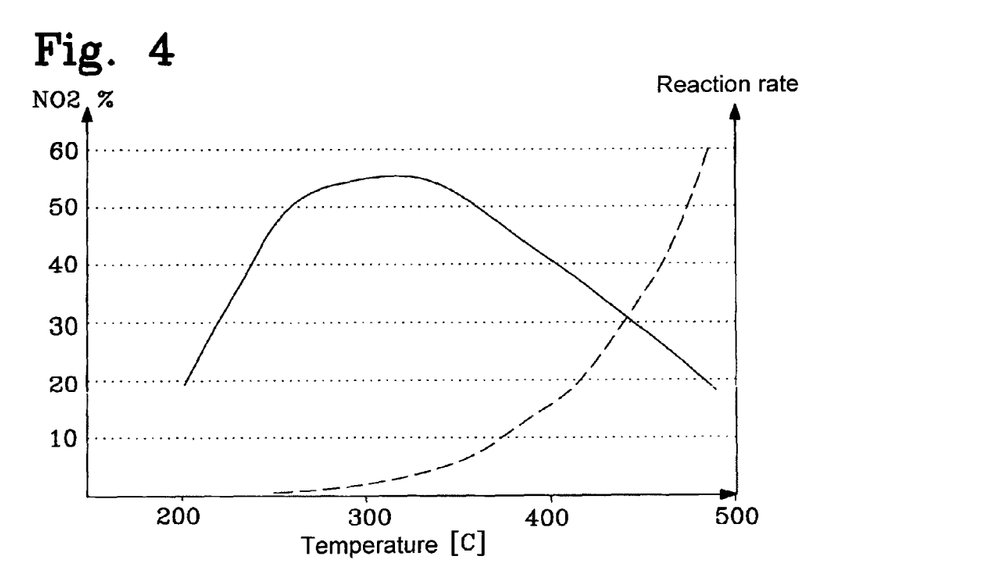
FIG. 4 depicts the temperature dependency of oxidation of nitrogen oxide to nitrogen dioxide in an oxidation catalyst.

However, oxidation of nitrogen oxide to nitrogen dioxide in the oxidation catalyst is also a very temperature-dependent process, as exemplified in FIG. 4. As may be seen in the diagram, it is possible at favourable temperatures for the proportion of nitrogen dioxide to the total amount of nitrogen oxides in the exhaust flow to be increased to nearly 60%. As the diagram also shows, a temperature of the order of 250-350° C. would therefore be optimum in passive regeneration for achieving as much oxidation of nitrogen oxide to nitrogen dioxide as possible.

As described in relation to equation 2 and FIG. 3, however, a completely different temperature situation applies to the actual burn-out process. This temperature situation is represented by a broken line in FIG. 4 and, as may be seen, the reaction rate may be regarded as virtually non-existent at particle filter temperatures below 200-250°. It should however be noted that the temperature indications referred to are merely examples and that actual values may differ from them. For example, the way in which the temperatures are determined/calculated might affect the temperature limits. Some ways of determining the filter's temperature are exemplified below.

If there is free access to nitrogen dioxide, as high a filter temperature as possible would therefore be preferable. As may also be seen in FIG. 4, however, this leads to low oxidation of nitrogen oxide to nitrogen dioxide. This means that the regeneration will not be able to derive full benefit from the high filter temperature, since the reaction will be limited by shortage of nitrogen dioxide. It is however still the case, according to the broken line in FIG. 4, that the particle filter has to reach at least a lowest temperature for regeneration within a reasonable time to be possible. For this reason, measures to raise the temperature of the filter are also applied as above.

The temperature-raising measures may be achieved by controlling the engine in such a way as to result in a high exhaust temperature, which is done by lowering the engine's efficiency to a low level so that a large portion of the energy changes to heat. A low efficiency is achieved by the fuel being injected late in the combustion cycle, after the piston has passed top dead centre and is therefore moving down. This means that the fuel supplied contributes less to generation of crankshaft torque and does instead to a greater extent merely burn and thereby generate heat. By controlling the injection time (injection angle) the injection may be controlled in such a way that the fuel is in principle ignited but does not make a particularly large contribution to generation of power for propelling the vehicle. The engine is also controlled towards low λ values, i.e. towards low air supply, to reduce the cooling effect which occurs when large amounts of air (high λ values) are used in the combustion.

The exhaust temperature and consequently the filter temperature increase depend not only on the efficiency of the engine but also on its current load, so this too may be maximised. This may for example be achieved by increasing the pumping work, i.e. the braking torque to which the engine is subjected by resistance in the exhaust flow. This braking torque may be increased by means of, for example, an exhaust brake such that constriction of the exhaust flow will result in a braking torque.

Moreover, vehicles are usually provided with ancillaries which are driven by the engine and therefore take power from the vehicle's propulsion. Examples of such ancillaries comprise cooling units etc., and controlling them in such a way that they exert high or maximum loads upon the engine makes it necessary for the torque generated during combustion to be increased in order to be able to maintain desired crankshaft torque and hence desired vehicle speed.

There are thus methods for raising the temperature of the exhaust gases from the engine's combustion, thereby potentially raising the temperature of the particle filter to desired levels.

However, there are situations where the resulting exhaust temperature, despite temperature-raising measures as above, becomes so low that the desired burn-out rate is not reached and the regeneration therefore becomes unacceptably slow. This means that the vehicle might run for long periods with temperature-raising measures activated, potentially resulting in very high fuel consumption with substantially no benefit.

Figure 5:
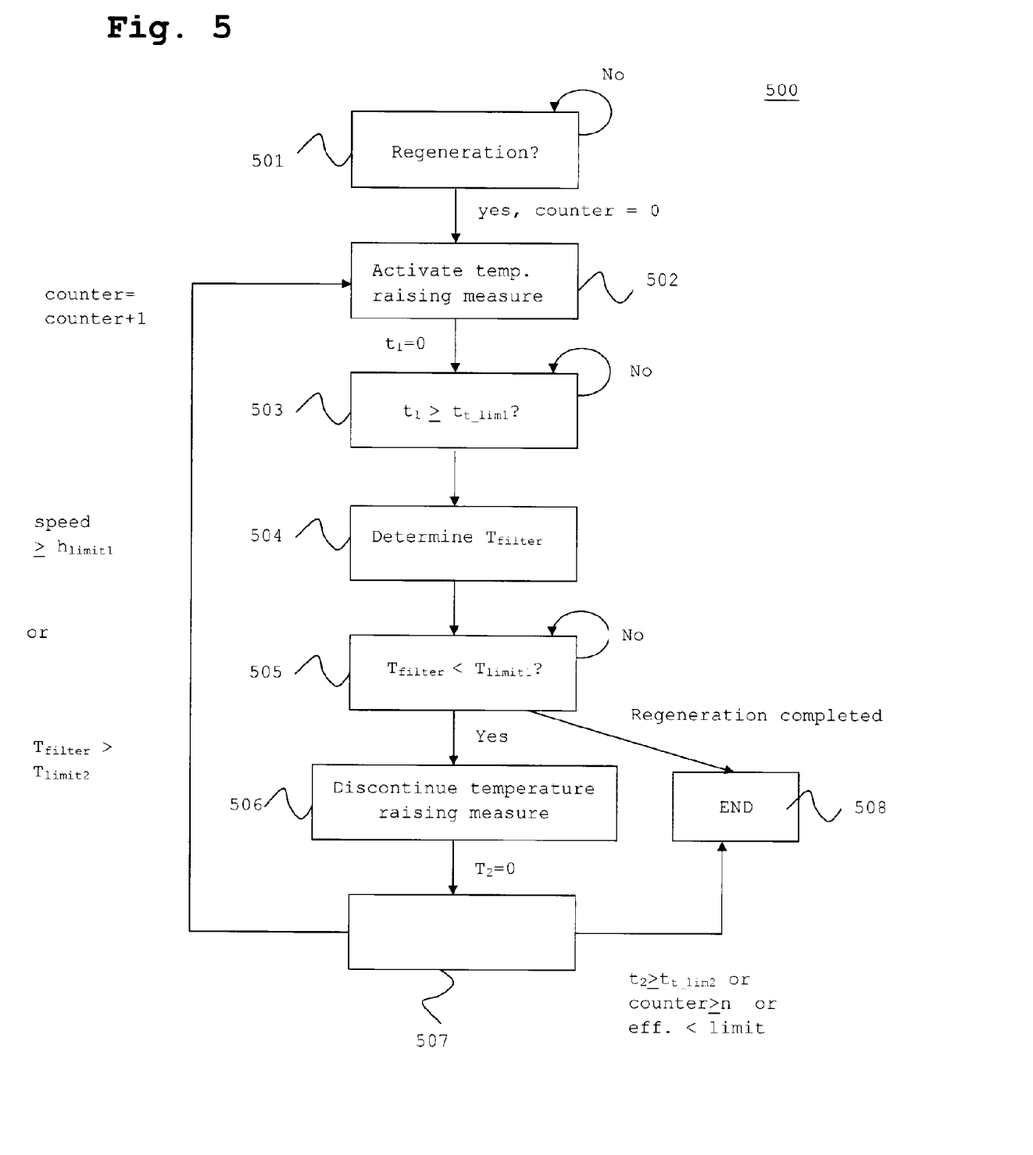
FIG. 5 is a schematic diagram of an embodiment example according to the present invention.

As above, the present invention relates to a method for avoiding regeneration in situations where it becomes unacceptably slow, and FIG. 5 depicts a method example 500.

The method starts at step 501, which determines whether the degree of filling of the particle filter is above a first level. Determining the filter's degree of filling may for example be done as described above, e.g. by determining whether the differential pressure across the filter exceeds a first level. When the differential pressure measured indicates that the degree of filling is above said first level, in which case filter-regenerating measures need to be taken as above, the present invention is activated. So long as such is not the case, the method remains at step 501.

When the particle filter's degree of filling is above said first level, the method moves on to step 502 while at the same time a counter is zeroed. Step 502 activates one or more suitable measures for raising the temperature of the filter so that regeneration can take place. The present invention relates to passive filter regeneration, which may be done by several different methods. The present invention is in principle applicable to all the ways of effecting passive regeneration. The invention is therefore not restricted to any specific method for effecting passive regeneration. The invention does not relate to active regeneration.

The method then moves on to step 503 while at the same time a timer $t_1$ is started, and the method stays at step 503 until the timer $t_1$ reaches a time $t_{\_lim1}$, whereupon the method moves on to step 504, at which the particle filter's temperature $T_{filter}$ is determined. The method moves on to step 505.

Step 505 determines whether the particle filter's temperature $T_{filter}$ is below a first limit $T_{limit1}$. This limit is set at a temperature which is so low that according to the present invention it is not deemed viable to continue with temperature-raising measures when the filter temperature, despite the ongoing temperature-raising measures, is unlikely to reach a high enough level to achieve a desired regeneration rate. The filter temperature may be determined in some suitable way, e.g. any of those described below. $T_{limit1}$ may for example be a suitable temperature below 250° C., or some other suitable temperature.

If the current filter temperature is above $T_{limit1}$, the method stays at step 505 until the regeneration is completed, i.e. until the filter's degree of filling is below a second level which is lower than said first level and at which the regeneration is deemed completed. This level may for example take the form of the filter being completely empty, but might also be a level at which a certain soot load remains. When the regeneration has been completed, the method ends at step 508.

The filter's degree of filling and temperature may be determined at uniform or appropriate intervals, e.g. at intervals of 1 second, 5 seconds, 10 seconds, 30 seconds, 1 minute or some other suitable period of time, e.g. between 1 second and 600 seconds, after which another filter temperature and/or degree of filling is determined as above.

If step 505 finds that the current filter temperature $T_{filter}$ is below $T_{limit1}$, the method moves on to step 506 at which the temperature-raising measures are discontinued.

The method then moves on to step 507 while at the same time a timer $t_2$ is started. Step 507 is a waiting step at which, with the temperature-raising measures switched off, the method stays until the timer $t_2$ reaches a time $t_{t\_lim2}$ or until any of the conditions described below is fulfilled.

When the method reaches step 507, it first determines whether the counter has reached a value n. If so, the method moves immediately on to step 508 as below even if the timer $t_2$ has not reached $t_{t\_lim2}$.

As well as incrementing the timer $t_2$, step 507 does at the same time monitor the particle filter temperature and/or the vehicle speed. In the present example, both the filter temperature and the vehicle speed are monitored. The vehicle speed is compared with a speed limit $h_{limit1}$ to see whether it is equal to or higher than this limit. This limit is set at a speed at which the filter is likely, at least on the basis of temperature-raising measures as above, to be able to reach a desired temperature despite its current temperature being low. If it is found that the speed exceeds $h_{limit1}$ which may for example be due to the vehicle having just been accelerated to a higher speed from a low speed, the method reverts to step 502, so long as the timer $t_2$ has not reached $t_{t\_lim2}$, in order to reactivate one or more temperature-raising measures. At the same time, the timer $t_2$ is stopped and the counter is incremented by one.

Similarly, the method reverts to step 502 if it is found at step 507 that the filter temperature $T_{filter}$ is above a second limit $T_{limit2}$. This also happens so long as the timer $t_2$ has not reached $t_{t\_lim2}$. $T_{limit2}$ may be set at any suitable level, e.g. a temperature higher than $T_{limit1}$. $T_{limit2}$ is a temperature at which a further attempt may be deemed justified so long as the counter has not reached the value n. $T_{limit2}$ may for example be a suitable temperature over 250° C. In a similar way, the timer $t_2$ is stopped and the counter is incremented by one.

$T_{limit2}$ may also depend on the filter temperature determined previously at step 504 and may for example be x degrees higher than that determined at step 504, x being set at any suitable value.

If the timer reaches $t_{t\_lim2}$ or the counter reaches the value n, which may be any suitable value (n may for example depend on the length of $t_{t\_lim1}$ above, such that a long $t_{t\_lim1}$ may result in a lower value of n, and vice versa), the process moves on to step 508 at which the regeneration attempt ends. The regeneration attempt therefore ends when it is deemed to have proceeded long enough (either by the timer $t_2$ having reached $t_{t\_lim2}$ or by the counter having reached the value n, meaning that n regeneration attempts have been made, e.g. because the filter temperature has fluctuated greatly) but it has not been possible to complete the regeneration.

Discontinuing according to the present invention the temperature-raising measures when the filter temperature, despite ongoing measures to raise it, is still too low thus makes it possible to save fuel in situations where no regeneration is taking place or regeneration is taking place at such a low rate that the increased fuel consumption is not justifiable.

The method illustrated in FIG. 5 may also determine an effectiveness for the regeneration at step 507. If the effectiveness of the regeneration is too low, which may for example be determined on the basis of whether the filter temperature $T_{filter}$ is below $T_{limit1}$ and/or $T_{limit2}$ for too long a time, but also on the basis of other parameters, e.g. the derivative of the differential pressure across the filter or soot oxidation models based on temperature, NOx and soot flow through the filter etc., the regeneration is discontinued as above when it does not reach a desired rate. Thus the temperature limit $T_{limit1}$ may, with or without further parameters, be used to define a desired regeneration rate. Depending on prevailing conditions, different regeneration rates may be acceptable, and the desired rate may therefore be arranged to vary from one occasion to another.

In an embodiment, the method illustrated in FIG. 5 is barred from being applied again for a time when it has reached step 508, to avoid unnecessarily starting other regeneration attempts. This bar might be lifted before another attempt would really have been permissible if, for example, the filter temperature exceeds a certain value, e.g. $T_{limit1}$ or $T_{limit2}$ above.

The method according to the invention also comprises the possibility that an ongoing regeneration which proceeds for a time when the regeneration conditions are advantageous might be discontinued not because it has been completed but because the conditions change so much during the regeneration that the filter temperature $T_{filter}$ drops from an advantageous level to a less advantageous one at which continuing regeneration is deemed worthless.

The method according to the invention also entails the possibility, since temperature-raising measures during filter regeneration are in principle always accompanied by losses, especially in the form of increased fuel consumption, that the fuel consumption might revert to normal until a fresh regeneration attempt is made. This is to prevent unnecessary activation of temperature-raising measures which would nevertheless be discontinued.

So long as the filter temperature $T_{filter}$ stays above $T_{limit1}$, regeneration will therefore proceed in a conventional way until it is deemed completed, e.g. because the differential pressure has dropped to a desired level. However, once the filter temperature drops below $T_{limit1}$, the regeneration is discontinued as above to avoid unnecessarily running the vehicle with temperature-raising measures which still do not result in a desired filter temperature.

There are various ways of determining the particle filter temperature applied in the regulation described above. In the embodiment depicted in FIG. 2, a first temperature sensor 210 is situated upstream of the oxidation catalyst 205. A second temperature sensor 211 is situated downstream of the oxidation catalyst (upstream of the particle filter), and a third temperature sensor 212 is situated downstream of the particle filter 202. The filter temperature may for example be determined on the basis of the average of the temperatures measured by the sensors 211, 212. Alternatively, only the temperature from sensor 211 or 212 might be used. Similarly, some other suitable temperature sensor may be used, e.g. the sensor 210, which calculates a filter temperature in conjunction with a model of the post-treatment system, e.g. in conjunction with current exhaust flow.

The present invention is exemplified above in relation to vehicles. The invention is also applicable, however, to any means of transport in which the exhaust cleaning system as above is applicable, e.g. watercraft or aircraft with combustion/regeneration processes as above. If the present invention is implemented in other types of means of transport than vehicles, certain of the method steps exemplified may be omitted, e.g. determination of a vehicle speed.

The invention claimed is:

1. A method pertaining to regeneration of a particle filter pertaining to a combustion process, wherein the filter is arranged to treat exhaust gases arising from combustion in a combustion engine, the method comprising:
   (a) a first activating of at least one step to raise the temperature of said particle filter;
   (b) determining a temperature $T_{filter}$ of said particle filter;
   (c) comparing said determined temperature $T_{filter}$ with a first temperature $T_{limit1}$;
   d) when said determined temperature $T_{filter}$ is below said first temperature $T_{limit1}$, discontinuing said step to raise the temperature of said particle filter; and
   (e) a second activating of at least one step to raise the temperature of said particle filter when said temperature $T_{filter}$ of said filter exceeds a second temperature limit $T_{limit2}$ which is higher than said first temperature $T_{limit1}$ after said step for raising temperature of said particle filter has been discontinued.

2. A method according to claim 1, wherein before (b) said determining of said temperature $T_{filter}$ of said particle filter,
   (f) waiting for a first period of time $T_{t\_lim1}$ after (a) said at least one temperature-raising step has been activated.

3. A method according to claim 1, wherein the method is performed for regenerating a particle filter of a vehicle and when said step for raising the temperature of said particle filter has been discontinued, activating at least one step for raising the temperature of said particle filter when a speed of said vehicle exceeds a first speed limit $h_{limit1}$.

4. A method according to claim 1, further comprising:
   discontinuing said regeneration when a first period of time has passed since said step for raising said temperature of said particle filter has been discontinued without at least one step for raising said temperature having thereafter been activated.

5. A method according to claim 1, further comprising discontinuing said regeneration when said step for raising the temperature of said particle filter has been discontinued and then has been reactivated a first number of times.

6. A method according to claim 1, further comprising determining an effectiveness of said regeneration and discontinuing said regeneration if said effectiveness determined is below a first value.

7. A method according to claim 4, further comprising when said regeneration has been discontinued, preventing regeneration from being restarted during a second period of time.

8. A method according to claim 1, further comprising applying the method when the degree of filling of the particle filter exceeds a first level.

9. A method according to claim 1, wherein said regeneration method is a method performed for $NO_2$ based regeneration of said particle filter.

10. A method according to claim 1, wherein said first temperature $T_{limit1}$ is a selected temperature below 250° C.

11. A method according to claim 10, wherein said second temperature $T_{limit2}$ is a selected temperature above 250° C.

12. A method according to claim 1, further comprising determining said first and second temperatures by one or more temperature sensors situated in or near to said particle filter.

13. A method according to claim 1, further comprising determining said first and second temperatures by a respective temperature sensor situated in the exhaust flow, in conjunction with a model of said exhaust treatment.

14. A system for regeneration of a particle filter pertaining to a combustion process comprising:
   a filter configured to treat exhaust gases arising from combustion in a combustion engine;
   said system comprising:
   at least one device configured and operable and located to perform at least one step to raise a temperature of said particle filter,
   when said device to perform said at least one step for raising the temperature of said particle filter is activated, said system comprises:
   (a) a temperature determining device configured for determining a temperature $T_{filter}$ of said particle filter;
   (b) a comparing device configured and operable for comparing said determined temperature $T_{filter}$ with a first temperature $T_{limit1}$, and comparing said determined temperature $T_{filter}$ with a second temperature limit; wherein
   (c) when said determined temperature $T_{filter}$ is below said first temperature $T_{limit1}$, operation of said at least one device to perform said at least one step for raising the temperature of said particle filter is discontinued; and
   (d) at least one step for raising the temperature of said particle filter is activated when the temperature $T_{filter}$ of said filter exceeds said second temperature limit $T_{limit2}$, which is higher than said first temperature $T_{limit1}$, after operation of said at least one device to perform said at least one step for raising the temperature of said particle filter has been discontinued.

15. A vehicle comprising a system according to claim 14.

16. A method according to claim 1, further comprising before the step of determining temperature for regeneration, determining the level of fill of the particle filter is above a set level and when the set level of fill is exceeded, starting the regeneration process.

17. A method according to claim 1, further comprising selecting said first temperature to be below a temperature sufficient for regenerating the particle filter.

18. A method pertaining to regeneration of a particle filter pertaining to a combustion process, wherein the filter is arranged to treat exhaust gases arising from combustion in a combustion engine, the method comprising:
   a) activating at least one measure for raising the temperature of said particle filter;
   b) selecting a first temperature $T_{limit1}$ which is below a temperature sufficient for regenerating the particle filter;
   c) determining a temperature $T_{filter}$ of said particle filter;
   d) comparing said determined temperature $T_{filter}$ with said first temperature $T_{limit1}$;
   e) when said determined temperature $T_{filter}$ is i below said first temperature $T_{limit1}$, discontinuing said measure for raising the temperature of said particle filter; and f) after discontinuing said measure for raising the temperature of said particle filter, activating at least one measure for raising the temperature of said particle filter when the temperature $T_{filter}$ exceeds a second temperature $T_{limit2}$ which is higher than said first temperature $T_{limit1}$.

\* \* \* \* \*